US011970231B2

(12) United States Patent
Zwegers et al.

(10) Patent No.: US 11,970,231 B2
(45) Date of Patent: Apr. 30, 2024

(54) CAUSING A DIFFERENCE BETWEEN STEERING ANGLES OF FRONT WHEELS OR REAR WHEELS OF A VEHICLE IN A PARK MODE

(71) Applicant: Toyota Motor Engineering & Manufacturing North America, Inc., Plano, TX (US)

(72) Inventors: Corey Zwegers, Dexter, MI (US); Robert C. MacArthur, Ypsilanti, MI (US); Claudia A. Ma, Northville, MI (US); Shigenori Shibata, Ann Arbor, MI (US); Adam R. VanAntwerp, Chelsea, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 195 days.

(21) Appl. No.: 17/319,172

(22) Filed: May 13, 2021

(65) Prior Publication Data

US 2022/0363313 A1    Nov. 17, 2022

(51) Int. Cl.
*B62D 5/04* (2006.01)
*B60W 30/06* (2006.01)
(Continued)

(52) U.S. Cl.
CPC ........... *B62D 7/1545* (2013.01); *B62D 5/006* (2013.01); *B62D 6/008* (2013.01)

(58) Field of Classification Search
None
See application file for complete search history.

(56) References Cited

U.S. PATENT DOCUMENTS

| 4,572,316 A | 2/1986 | Kanazawa et al. |
| 4,998,593 A | 3/1991 | Karnopp et al. |
(Continued)

FOREIGN PATENT DOCUMENTS

| CN | 109677397 A | * 4/2019 | ............ B60W 30/06 |
| CN | 111717205 A | 9/2020 | |
| KR | 20180119762 A | 11/2018 | |

OTHER PUBLICATIONS

Sandeep Singh, "Design Four Wheel Steering System With Four Modes," Tech Briefs, 3 pages, Apr. 17, 2015, found at https://contest.techbriefs.com/2015/entries/automotive-transportation/5236.
(Continued)

*Primary Examiner* — Adam D Tissot
*Assistant Examiner* — Laura E Linhardt
(74) *Attorney, Agent, or Firm* — Christopher G. Darrow; Darrow Mustafa PC

(57) ABSTRACT

A vehicle can include a first wheel, a second wheel, and a steering system. Either both the first wheel and the second wheel can be front wheels or both the first wheel and the second wheel can be rear wheels. The steering system can be configured to concurrently cause: (1) a steering angle of the first wheel to be at a first angle and (2) a steering angle of the second wheel to be at a second angle. A difference angle can be a difference of the first angle subtracted from the second angle and can be greater than an angle determined to comply with Ackermann steering geometry. Such a difference angle can act to securely brake the vehicle when the vehicle is parked at a location at which a three-dimensional shape of a topological relief of the location can complicate an effort to securely brake the vehicle.

10 Claims, 6 Drawing Sheets

(51) Int. Cl.
*B62D 5/00* (2006.01)
*B62D 6/00* (2006.01)
*B62D 7/08* (2006.01)
*B62D 7/15* (2006.01)
*B62D 7/20* (2006.01)
*G01S 19/49* (2010.01)

(56) References Cited

U.S. PATENT DOCUMENTS

| | | | |
|---|---|---|---|
| 5,758,740 | A | 6/1998 | Park |
| 6,827,176 | B2 | 12/2004 | Bean et al. |
| 10,689,029 | B2 | 6/2020 | Schwalbe et al. |
| 2016/0052356 | A1* | 2/2016 | Tamura .................. B62D 7/18 280/124.126 |
| 2017/0282914 | A1* | 10/2017 | Lavoie ................. B60W 30/06 |
| 2021/0001921 | A1* | 1/2021 | Ishihara ................ B62D 17/00 |
| 2022/0219752 | A1* | 7/2022 | Preijert .................. B62D 7/20 |

OTHER PUBLICATIONS

Rithvik et al., "Four wheel three mode steering system," International Research Journal of Engineering and Technology, vol. 5, issue 3, pp. 762-764, Mar. 2018.
Unknown, "Steering," 15 pages, last accessed Apr. 4, 2021, found at https://en.wikipedia.org/wiki/ Steering#Articulated_steering.
Unknown, "Ackermann steering geometry," 3 pages, last accessed on Apr. 5, 2021, found at https://en.wikipedia.org/wiki/Ackermann_steering_geometry.

* cited by examiner

CAUSING A DIFFERENCE BETWEEN STEERING ANGLES OF FRONT WHEELS OR REAR WHEELS OF A VEHICLE IN A PARK MODE

TECHNICAL FIELD

The disclosed technologies are directed to causing a difference between steering angles of front wheels or rear wheels of a vehicle in a park mode.

BACKGROUND

A steering system of a vehicle can be used to cause a path of travel of the vehicle to follow a desired course. Typically, at a time at which the path of travel of the vehicle is along a straight line, an axis, around which a wheel can rotate, can be perpendicular to the path of travel. Conventionally, components of a steering system can include, for example, one or more of linkages, rods, pivots, gears, or the like. Such components can be used to cause an angle between the axis and the path of travel along the straight line to be temporarily different from perpendicular (e.g., at a steering angle) until a time at which the vehicle is again on the desired course. More recently, four-wheel steering technology has been developed that can increase a degree of maneuverability of a vehicle. Components of such four-wheel steering technology can include, for example, an actuator configured to control a steering angle of a wheel.

SUMMARY

A vehicle can include a first wheel, a second wheel, and a steering system. Either both the first wheel and the second wheel can be front wheels or both the first wheel and the second wheel can be rear wheels. The steering system can be configured to concurrently cause: (1) a steering angle of the first wheel to be at a first angle and (2) a steering angle of the second wheel to be at a second angle. A difference angle can be a difference of the first angle subtracted from the second angle. The difference angle can be greater than an angle determined to comply with Ackermann steering geometry.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to causing a difference between steering angles of front wheels or rear wheels of a vehicle in a park mode. Four-wheel steering technology has been developed that can increase a degree of maneuverability of a vehicle. Components of such four-wheel steering technology can include, for example, an actuator configured to control a steering angle of a wheel. The disclosed technologies can use, for example, an actuator configured to control a steering angle of a wheel to allow for there to be a difference between steering angles of front wheels or rear wheels of a vehicle in a park mode. Such a difference between the steering angles can provide several advantages at a time at which the vehicle is in the park mode. For example, such a difference between the steering angles can act to securely brake the vehicle. For example, such a difference between the steering angles can act to securely brake the vehicle at a time at which the vehicle is in the park mode at a location on a hill or at a location at which a three-dimensional shape of a topological relief of the location can complicate an effort to securely brake the vehicle. For example, such a difference between the steering angles can complicate an effort to tow the vehicle from the location or for a wrongdoer to move the vehicle from the location (e.g., steal the vehicle).

Figure 1:
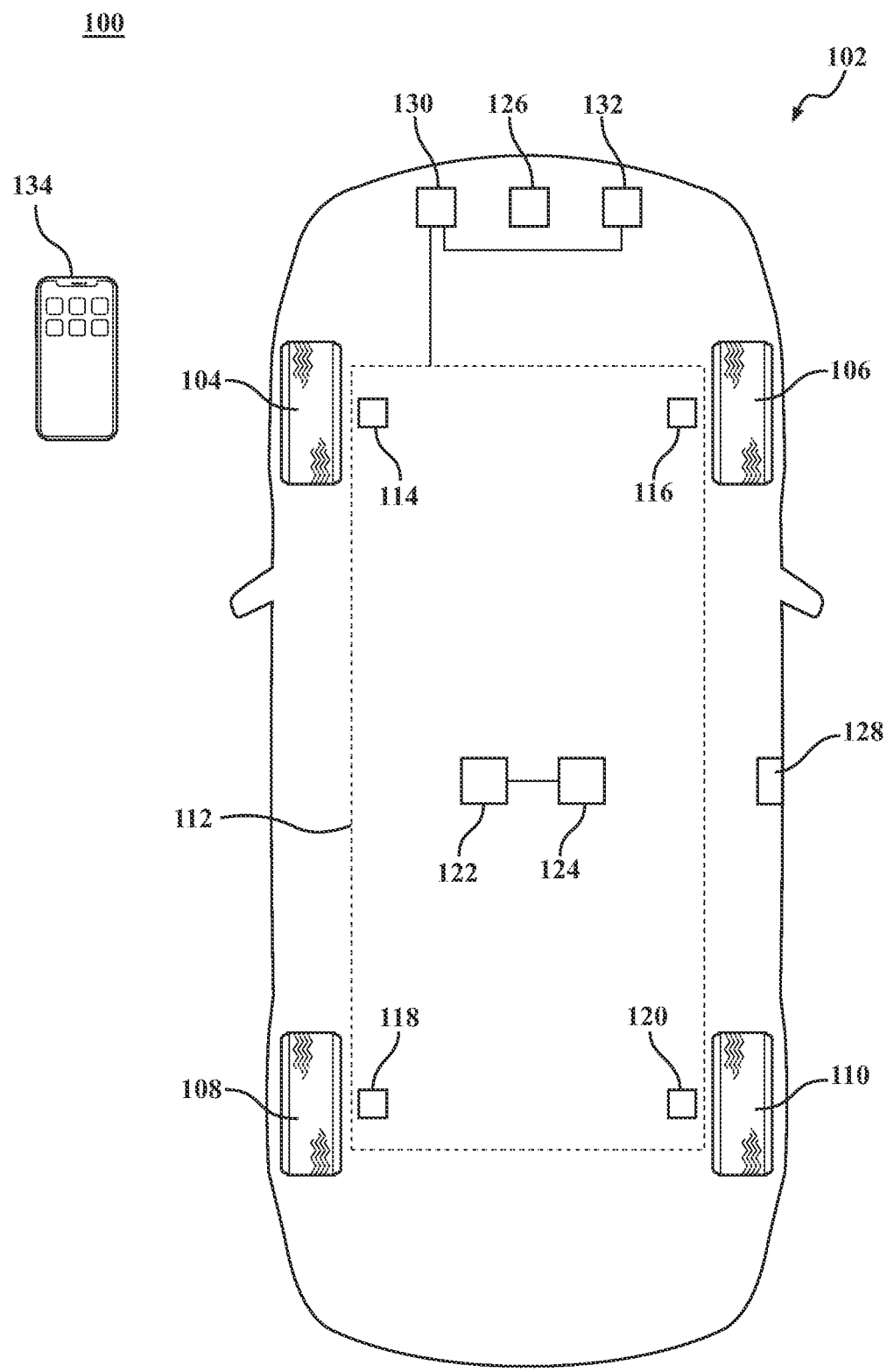
FIG. 1 includes a diagram that illustrates an example of an environment of a vehicle, according to the disclosed technologies.

FIG. 1 includes a diagram that illustrates an example of an environment 100 of a vehicle 102, according to the disclosed technologies. The vehicle 102 can include, for example, a front left wheel 104, a front right wheel 106, a rear left wheel 108, a rear right wheel 110, and a steering system 112. The steering system 112 can include, for example, an actuator 114 for the front left wheel 104, an actuator 116 for the front right wheel 106, an actuator 118 for the rear left wheel 108, and an actuator 120 for the rear right wheel 110.

Additionally, for example, the steering system 112 can include a module 122 and a memory 124.

Additionally, for example, vehicle 102 can include a device 126 configured to determine an orientation of the vehicle 102. For example, the device 126 can include an accelerometer.

Additionally, for example, the vehicle 102 can include a device 128 configured to determine a presence of a curb of a road. For example, the device 128 can be a visual detection system, a camera, a surround view camera system, or the like.

Additionally, for example, the vehicle 102 can include a communications device 130. The communications device 130 can be communicably coupled to the steering system 112. Additionally, for example, the vehicle 102 can include an interface 132. The interface 132 can be communicably coupled to the communications device 130. For example, the interface 132 can be disposed on a dashboard of the vehicle 102, a central console of the vehicle 102, or the like. For example, the interface 132 can be a button disposed on the dashboard, the central console, or the like. Additionally, for example, the environment 100 can include a mobile device 134. The mobile device 134 can be configured to be communicably coupled to the communications device 130.

According to the disclosed technologies, the vehicle 102 can include, for example, a first wheel (e.g., the front left wheel 104 or the rear left wheel 108), second wheel (e.g., the front right wheel 106 or the rear right wheel 110), and the steering system 112. Either: (1) both the first wheel and the second wheel are front wheels (e.g., the front left wheel 104 and the front right wheel 106) or (2) both the first wheel and the second wheel are rear wheels (e.g., the rear left wheel 108 and the rear right wheel 110). The steering system 112 can be configured to concurrently cause: (1) a steering angle of the first wheel to be at a first angle and (2) a steering angle of the second wheel to be at a second angle. A first difference angle can be a difference of the first angle subtracted from the second angle.

The first difference angle can be greater than an angle determined to comply with Ackermann steering geometry. As described above, conventionally, components of the steering system 112 can be used to cause an angle between an axis, around which a wheel can rotate, and a path of travel of the vehicle 102 along a straight line to be temporarily different from perpendicular (e.g., at the steering angle) until a time at which the vehicle 102 is on a desired course. At a time at which the vehicle 102 makes a right turn, for example, a radius of a path of travel of the front left wheel 104 can be greater than a radius of a path of travel of the front right wheel 106. In order to prevent a sideways slip of a tire of the front left wheel 104, a tire of the front right wheel 106, or both during a course of the right turn, the steering system 112 can cause the steering angle of the front left wheel 104 to be less than the steering angle of the front right wheel 106. A difference between the steering angle of the front left wheel 104 and the steering angle of the front right wheel 106 can be a function of a degree of sharpness of the right turn and can be determined using Ackermann steering geometry. For example, such a difference can be about ten degrees.

Figure 2:
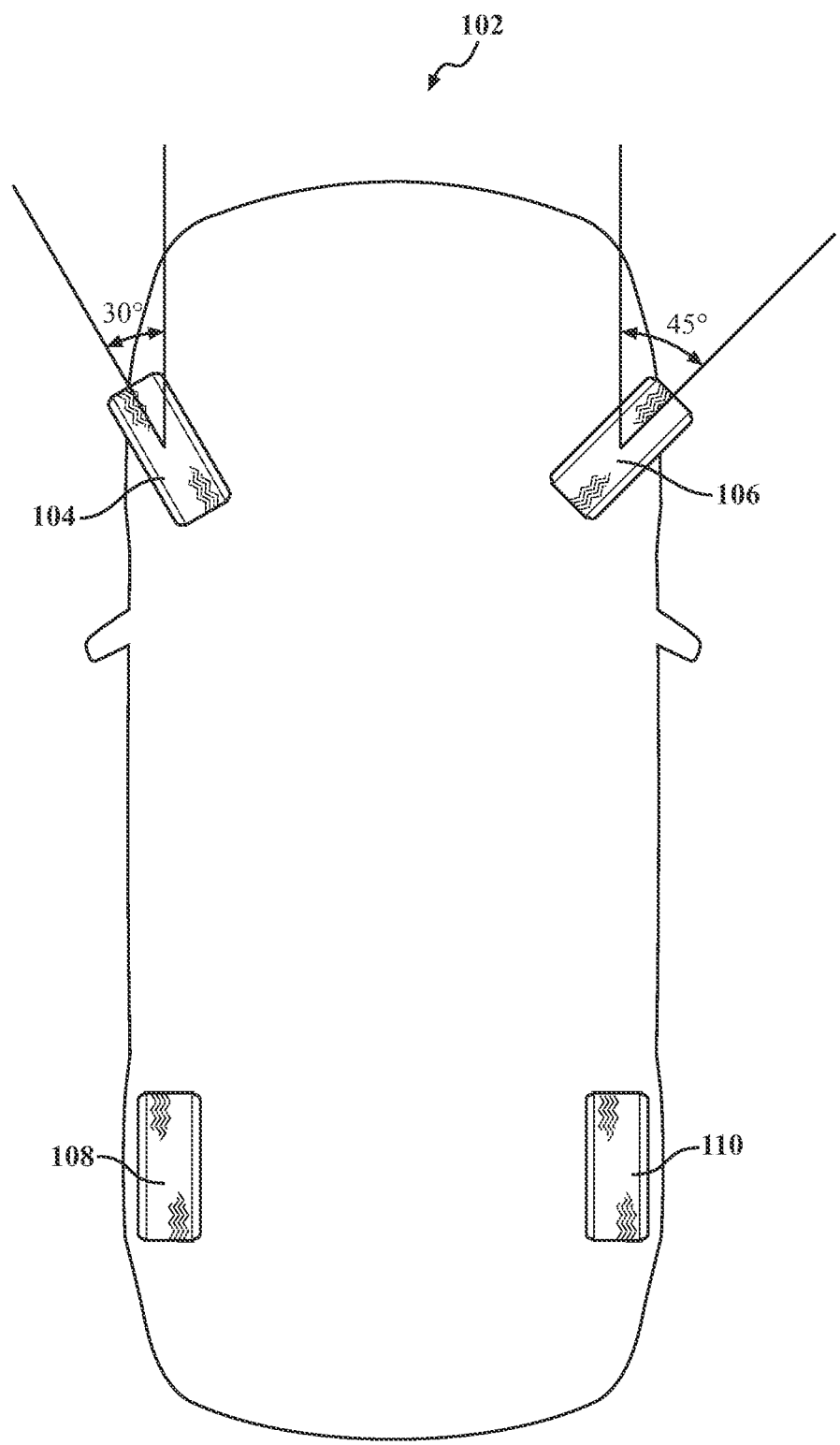
FIG. 2 includes a diagram that illustrates an example of a difference between steering angles of front wheels or rear wheels of the vehicle, according to the disclosed technologies.

FIG. 2 includes a diagram that illustrates an example 200 of a difference between steering angles of front wheels (e.g., the front left wheel 104 and the front right wheel 106) or rear wheels (e.g., the rear left wheel 108 and the rear right wheel 110) of the vehicle 102, according to the disclosed technologies. In the example 200: (1) the steering angle of the first wheel (e.g., the front left wheel 104 or the rear left wheel 108) can be the first angle: 30° for a left turn (i.e., −30°) and (2) the steering angle for the second wheel (e.g., the front right wheel 106 or the rear right wheel 110) can be the second angle: 45° for a right turn (i.e., +45°). The first difference angle can be the difference of the first angle (i.e., −30°) subtracted from the second angle (i.e., +45°): 75 degrees.

Returning to FIG. 1, additionally, for example, the steering system 112 can be configured to determine the steering angle of the first wheel (e.g., the front left wheel 104 or the rear left wheel 108) and the steering angle of the second wheel (e.g., the front right wheel 106 or the rear right wheel 110). For, example, the steering system 112 can include: (1) a first actuator configured to cause the first wheel to be in a position in accordance with a determination of the steering angle of the first wheel (e.g., the actuator 114 for the front left wheel 104 or the actuator 118 for the rear left wheel 108) and (2) a second actuator configured to cause the second wheel to be in a position in accordance with a determination of the steering angle of the second wheel (e.g., the actuator 116 for the front right wheel 106 or the actuator 120 for the rear right wheel 110). The steering system 112 can be configured to independently operate the first actuator and the second actuator.

In a first configuration, the steering system 112 can be configured to concurrently prevent, at a time at which the vehicle 102 is in a mode different from a park mode: (1) the steering angle of the first wheel (e.g., the front left wheel 104 or the rear left wheel 108) from being at the first angle and (2) the steering angle of the second wheel (e.g., the front right wheel 106 or the rear right wheel 110) from being at the second angle.

In a second configuration, the steering system 112 can be configured to concurrently cause, at a time at which the vehicle is in a park mode: (1) the steering angle of the first wheel (e.g., the front left wheel 104 or the rear left wheel 108) to be at the first angle and (2) the steering angle of the second wheel (e.g., the front right wheel 106 or the rear right wheel 110) to be at the second angle. For example, the steering system 112 can be configured to cause an operation to cause the difference between the steering angles of the wheels to occur in response to one or more of a transmission of the vehicle 102 being placed in a park setting, a parking brake of the vehicle 102 being engaged, or the like.

Additionally, for example, if the vehicle 102 includes the communications device 130, then the communications device 130 can be configured to: (1) receive information and (2) cause, in response to a receipt of the information, a signal to be conveyed to the steering system 112. For example, the information can be indicative of a desire of an individual associated with the vehicle 102 to cause the operation to cause the difference between the steering angles of the wheels to occur. For example, the information can include a personal identification number (PIN) of the individual. For example, if the vehicle 102 includes the interface 132, then the individual can enter the information into the interface 132. Additionally or alternatively, for example, if the environment 100 includes the mobile device 134, then the individual can enter the information into the mobile device 134. The steering system 112 can be configured to concurrently cause, in response to a receipt of the signal: (1) the steering angle of the first wheel (e.g., the front left wheel 104 or the rear left wheel 108) to be at the first angle and (2) the steering angle of the second wheel (e.g., the front right wheel 106 or the rear right wheel 110) to be at the second angle.

In a third configuration, if the vehicle 102 includes the communications device 130, then the communications device 130 can be configured to: (1) receive information indicative of a value of the first angle and a value of the second angle and (2) cause, in response to a receipt of the information, a signal to be conveyed to the steering system 112. For example, the individual may desire that the first angle has a first specific value and the second angle has a second specific value. For example, the information can include a personal identification number (PIN) of the individual. For example, if the vehicle 102 includes the interface 132, then the individual can enter the information into the interface 132. Additionally or alternatively, for example, if the environment 100 includes the mobile device 134, then the individual can enter the information into the mobile device 134. If the steering system 112 includes the memory 124, then the steering system 112 can be configured to cause, in response to a receipt of the signal: (1) the value of the first angle to be stored in the memory 124 and (2) the value of the second angle to be stored in the memory 124.

Figure 3:
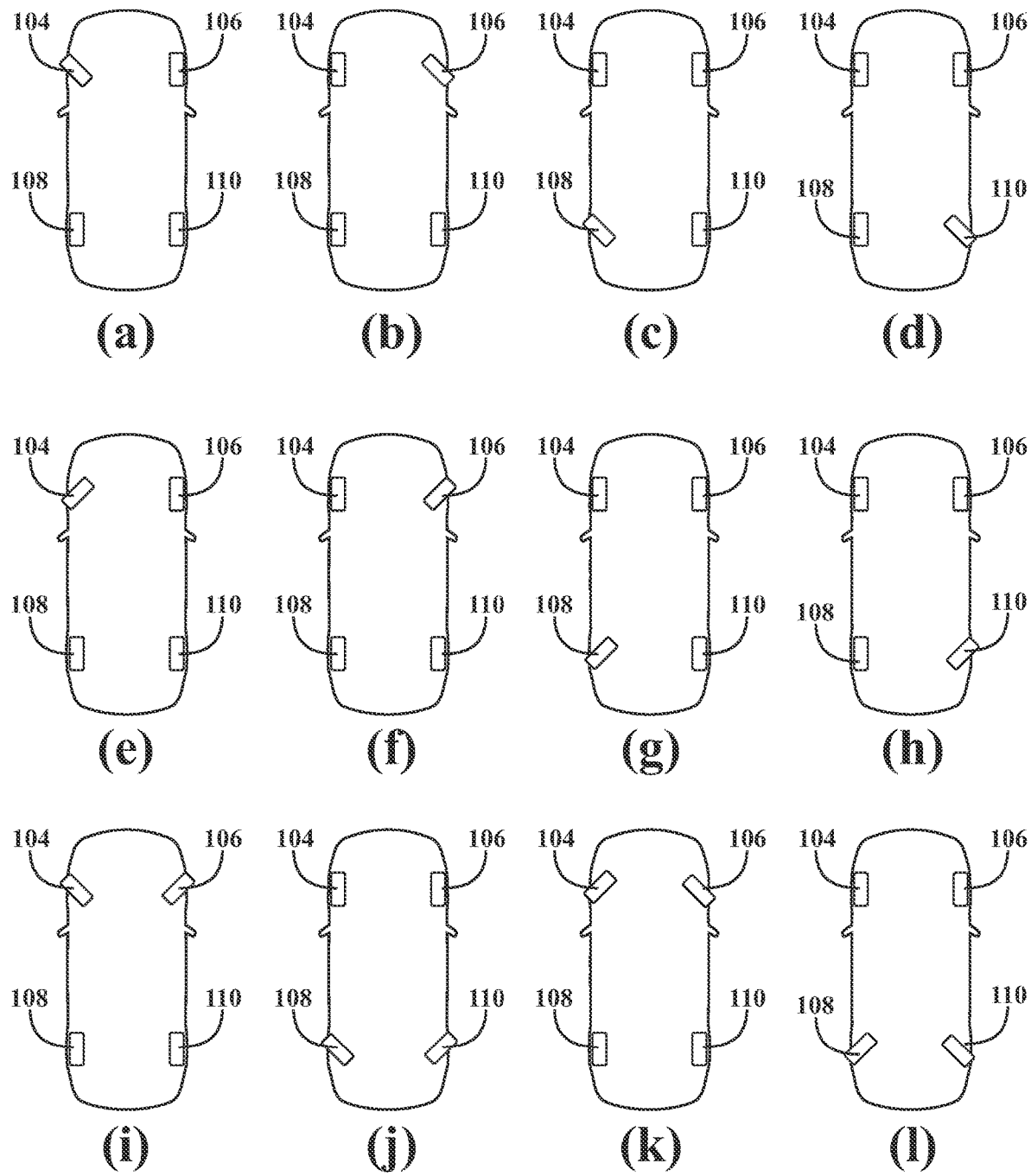
FIG. 3 includes diagrams that illustrate examples of combinations of steering angles of the front wheels or the rear wheels of the vehicle, according to the disclosed technologies.

FIG. 3 includes diagrams that illustrates examples of combinations of steering angles of the front wheels (e.g., the front left wheel 104 and the front right wheel 106) or the rear wheels (e.g., the rear left wheel 108 and the rear right wheel 110) of the vehicle 102, according to the disclosed technologies.

In a view (a) of FIG. 3, the steering angle of the front left wheel 104 is for a left turn and the steering angles of the front right wheel 106, the rear left wheel 108, and the rear right wheel 110 are for no turn. In a view (b) of FIG. 3, the steering angle of the front right wheel 106 is for a left turn and the steering angles of the front left wheel 104, the rear left wheel 108, and the rear right wheel 110 are for no turn. In a view (c) of FIG. 3, the steering angle of the rear left wheel 108 is for a left turn and the steering angles of the front left wheel 104, the front right wheel 106, and the rear right wheel 110 are for no turn. In a view (d) of FIG. 3, the steering angle of the rear right wheel 110 is for a left turn and the steering angles of the front left wheel 104, the front right wheel 106, and the rear left wheel 108 are for no turn.

In a view (e) of FIG. 3, the steering angle of the front left wheel 104 is for a right turn and the steering angles of the front right wheel 106, the rear left wheel 108, and the rear right wheel 110 are for no turn. In a view (f) of FIG. 3, the steering angle of the front right wheel 106 is for a right turn and the steering angles of the front left wheel 104, the rear left wheel 108, and the rear right wheel 110 are for no turn. In a view (g) of FIG. 3, the steering angle of the rear left wheel 108 is for a right turn and the steering angles of the front left wheel 104, the front right wheel 106, and the rear right wheel 110 are for no turn. In a view (h) of FIG. 3, the steering angle of the rear right wheel 110 is for a right turn and the steering angles of the front left wheel 104, the front right wheel 106, and the rear left wheel 108 are for no turn.

In a view (i) of FIG. 3, the steering angle of the front left wheel 104 is for a left turn, the steering angle of the front right wheel 106 is for a right turn, and the steering angles of the rear left wheel 108 and the rear right wheel 110 are for no turn. In a view (j) of FIG. 3, the steering angle of the rear left wheel 108 is for a left turn, the steering angle of the rear right wheel 110 is for a right turn, and the steering angles of the front left wheel 104 and the front right wheel 106 are for no turn. In a view (k) of FIG. 3, the steering angle of the front left wheel 104 is for a right turn, the steering angle of the front right wheel 106 is for a left turn, and the steering angles of the rear left wheel 108 and the rear right wheel 110 are for no turn. In a view (l) of FIG. 3, the steering angle of the rear left wheel 108 is for a right turn, the steering angle of the rear right wheel 110 is for a left turn, and the steering angles of the front left wheel 104 and the front right wheel 106 are for no turn.

Returning to FIG. 1, in a fourth configuration, if the steering system 112 includes the module 122, then the module 122 can be configured to determine a value of the first angle and a value of the second angle. If the steering system 112 includes the memory 124, then the memory 124 can be configured to store the value of the first angle and the value of the second angle.

For example, if the vehicle 102 includes the device 126, then the device 126 can be configured to: (1) determine an orientation of the vehicle 102 with respect to a three-dimensional shape of a topological relief of a location of the vehicle 102 and (2) cause, in response to a determination of the orientation of the vehicle 102, a signal to be conveyed to the steering system 112. The module 122 can be configured to determine, in response to a receipt of the signal, the value of the first angle and the value of the second angle.

Additionally or alternatively, for example, if the vehicle 102 includes the device 128, then the device 128 can be configured to: (1) determine a presence of a curb of a road within one meter of a location of one or more of the first wheel (e.g., the front left wheel 104 or the rear left wheel 108) or the second wheel (e.g., the front right wheel 106 or the rear right wheel 110) and (2) cause, in response to a determination of the presence of the curb, a signal to be conveyed to the steering system 112. The module 122 can be configured to determine, in response to a receipt of the signal, the value of the first angle and the value of the second angle.

Figure 4:
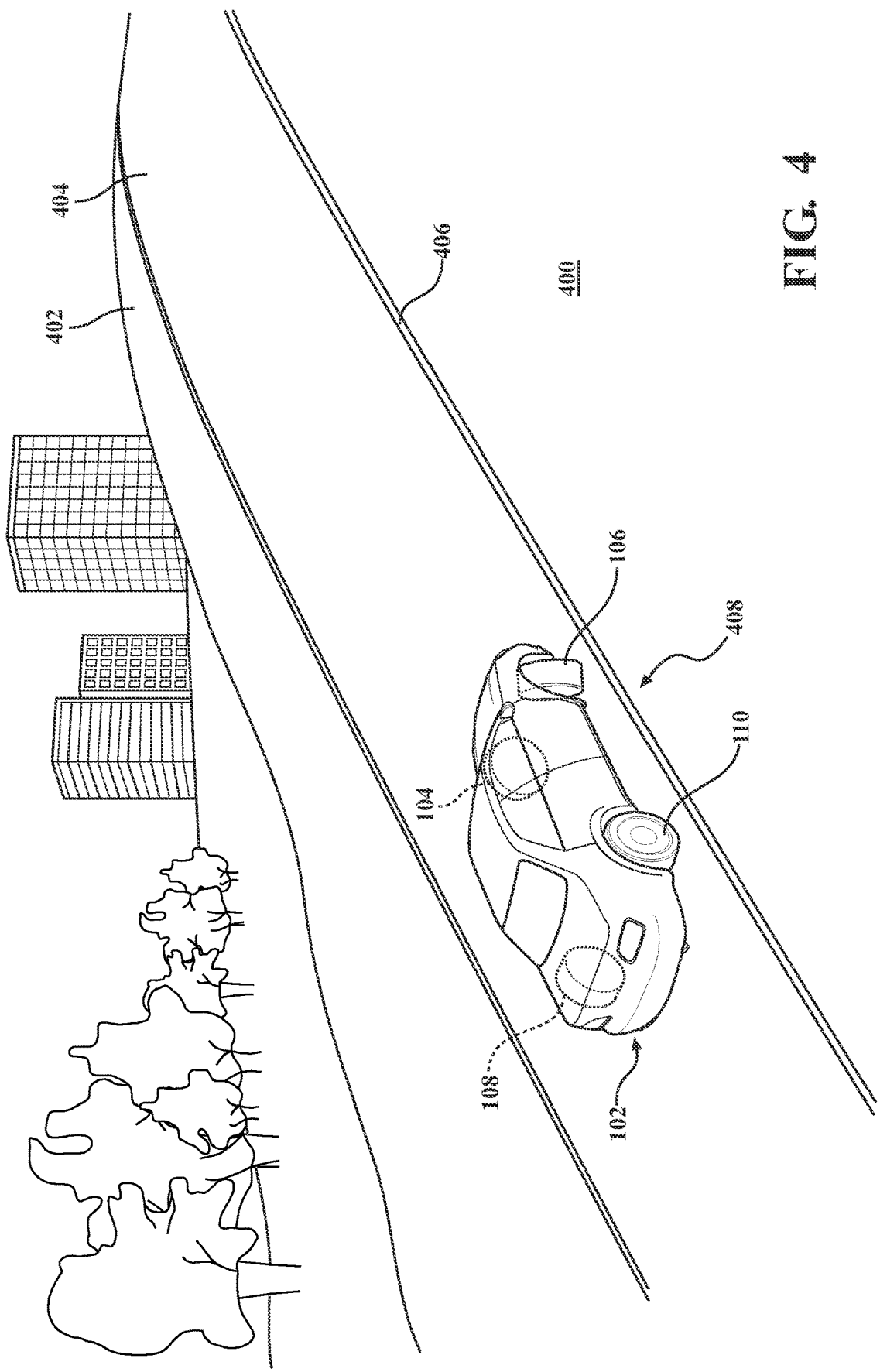
FIG. 4 includes a diagram that illustrates an example of an environment in which a fourth configuration of the disclosed technologies can operate.

FIG. 4 includes a diagram that illustrates an example of an environment 400 in which the fourth configuration of the disclosed technologies can operate. The environment 400 can include, for example, a hill 402 and a road 404. The road 404 can be disposed on the hill 402. The road 404 can have a curb 406.

With reference to FIGS. 1, 3, and 4, the device 126 can determine an orientation of the vehicle 102 with respect to a three-dimensional shape of a topological relief of a location 408 of the vehicle 102 on the road 404 on the hill 402. The device 126 can cause, in response to a determination of the orientation of the vehicle 102, a signal to be conveyed to the steering system 112. The module 122 can determine, in response to a receipt of the signal, the value of the first angle and the value of the second angle. For example, the module 122 may determine that the value of the first angle and the value of the second angle that correspond to the view (k) of FIG. 3 can best act to securely brake the vehicle 102 at the location 408 because the front left wheel 104 is reasonably close to being perpendicular to a gradient of the hill 402 at the location 408. In contrast, for example, the module 122 may determine that the value of the first angle and the value of the second angle that correspond to the view (f) of FIG. 3 may not act to securely brake the vehicle 102 at the location 408 because the front left wheel 104 is reasonably close to being along the gradient of the hill 402 at the location 408.

Likewise, the device 128 can determine a presence of the curb 406 of the road 404 within one meter of the location 408 of the second wheel (e.g., the front right wheel 106). The device 128 can cause, in response to a determination of the presence of the curb 406, a signal to be conveyed to the steering system 112. The module 122 can determine, in response to a receipt of the signal, the value of the first angle and the value of the second angle. For example, the module 122 may determine that the value of the first angle and the value of the second angle that correspond to the view (k) of FIG. 3 can best act to securely brake the vehicle 102 at the location 408 because the front right wheel 106 is positioned in a manner that would allow the vehicle 102 to roll towards the curb 406. In contrast, for example, the module 122 may determine that the value of the first angle and the value of the second angle that correspond to the view (f) of FIG. 3 may not act to securely brake the vehicle 102 at the location 408 because front right wheel 106 is positioned in a manner that would allow the vehicle 102 to roll away from the curb 406.

Returning to FIG. 1, in a fifth configuration, if the disclosed technologies include a third wheel (e.g., the rear left wheel 108) and a fourth wheel (e.g., the rear right wheel 110), then the steering system 112 can further be configured to concurrently cause: (1) a steering angle of the third wheel to be at a third angle and (2) a steering angle of the fourth wheel to be at a fourth angle. A second difference angle can be a difference of the third angle subtracted from the fourth angle. The second difference angle can be greater than the angle determined to comply with Ackermann steering geometry.

Figure 5A:
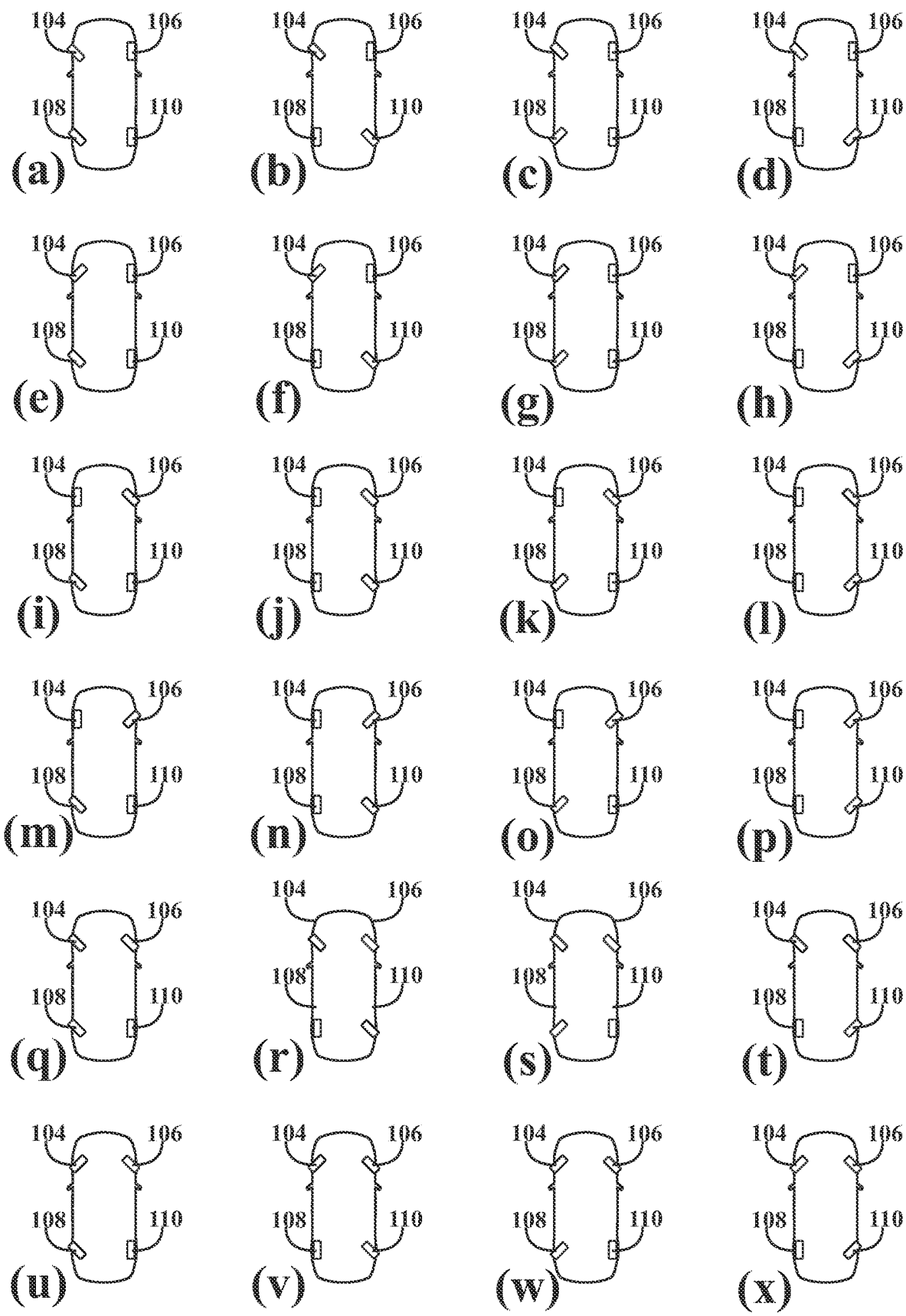
FIGS. 5A and 5B include diagrams that illustrate examples of combinations of the steering angles of the front wheels and the rear wheels of the vehicle, according to the disclosed technologies.
Figure 5B:
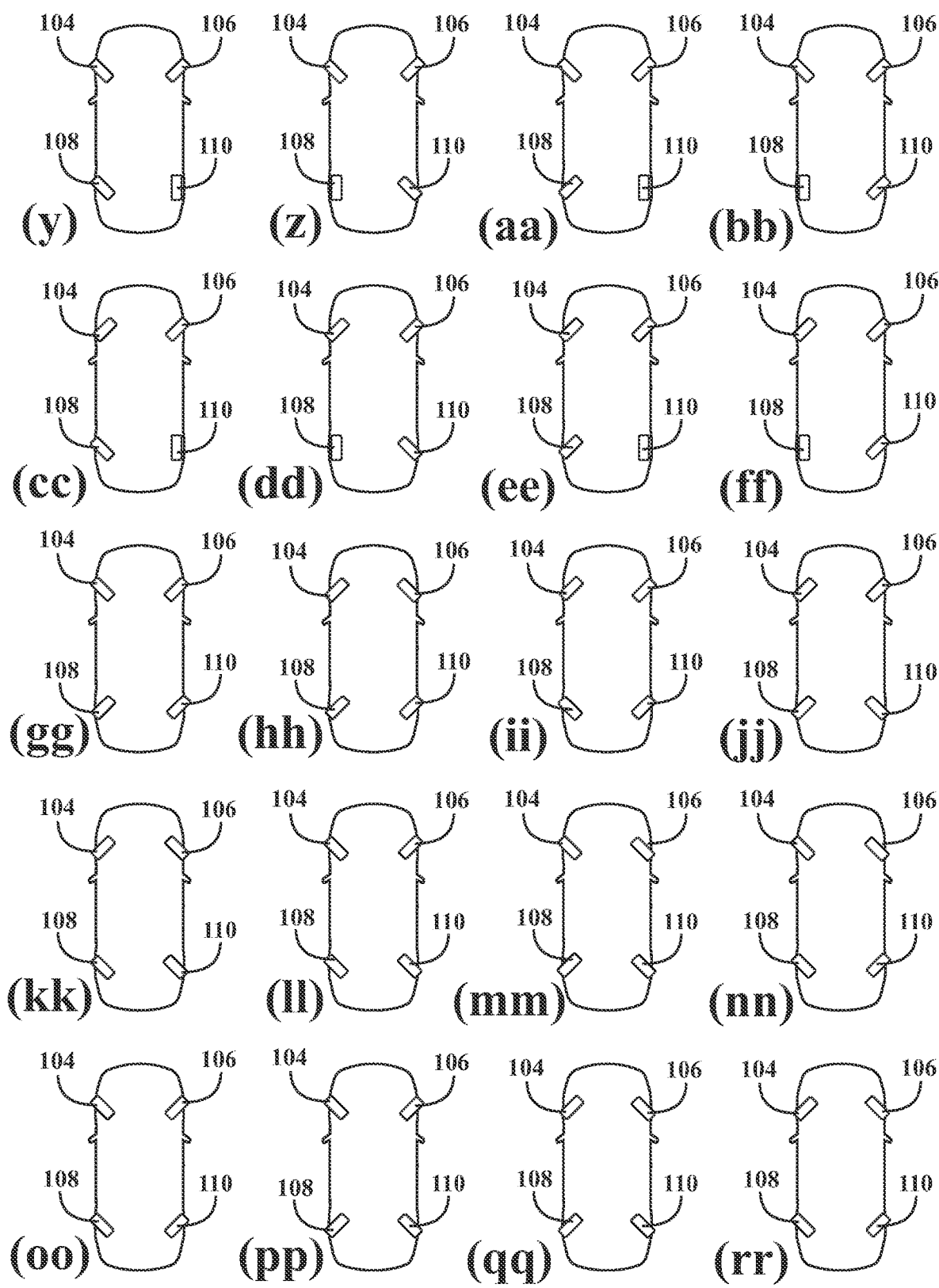

FIGS. 5A and 5B include diagrams that illustrates examples of combinations of the steering angles of the front wheels (e.g., the front left wheel 104 and the front right wheel 106) and the rear wheels (e.g., the rear left wheel 108 and the rear right wheel 110) of the vehicle 102, according to the disclosed technologies.

In a view (a) of FIG. 5A, the steering angle of the front left wheel 104 is for a left turn, the steering angle of the rear left wheel 108 is for a left turn, and the steering angles of the front right wheel 106 and the rear right wheel 110 are for no turn. In a view (b) of FIG. 5A, the steering angle of the front left wheel 104 is for a left turn, the steering angle of the rear right wheel 110 is for a left turn, and the steering angles of the front right wheel 106 and the rear left wheel 108 are for no turn. In a view (c) of FIG. 5A, the steering angle of the front left wheel 104 is for a left turn, the steering angle of the rear left wheel 108 is for a right turn, and the steering angles of the front right wheel 106 and the rear right wheel 110 are for no turn. In a view (d) of FIG. 5A, the steering angle of the front left wheel 104 is for a left turn, the steering angle of the rear right wheel 110 is for a right turn, and the steering angles of the front right wheel 106 and the rear left wheel 108 are for no turn.

In a view (e) of FIG. 5A, the steering angle of the front left wheel 104 is for a right turn, the steering angle of the rear left wheel 108 is for a left turn, and the steering angles of the front right wheel 106 and the rear right wheel 110 are for no turn. In a view (f) of FIG. 5A, the steering angle of the front left wheel 104 is for a right turn, the steering angle of the rear right wheel 110 is for a left turn, and the steering angles of the front right wheel 106 and the rear left wheel 108 are for no turn. In a view (g) of FIG. 5A, the steering angle of the front left wheel 104 is for a right turn, the steering angle of the rear left wheel 108 is for a right turn, and the steering angles of the front right wheel 106 and the rear right wheel 110 are for no turn. In a view (h) of FIG. 5A, the steering angle of the front left wheel 104 is for a right turn, the steering angle of the rear right wheel 110 is for a right turn, and the steering angles of the front right wheel 106 and the rear left wheel 108 are for no turn.

In a view (i) of FIG. 5A, the steering angle of the front right wheel 106 is for a left turn, the steering angle of the rear left wheel 108 is for a left turn, and the steering angles of the front left wheel 104 and the rear right wheel 110 are for no turn. In a view (j) of FIG. 5A, the steering angle of the front right wheel 106 is for a left turn, the steering angle of the rear right wheel 110 is for a left turn, and the steering angles of the front left wheel 104 and the rear left wheel 108 are for no turn. In a view (k) of FIG. 5A, the steering angle of the front right wheel 106 is for a left turn, the steering angle of the rear left wheel 108 is for a right turn, and the steering angles of the front left wheel 104 and the rear right wheel 110 are for no turn. In a view (l) of FIG. 5A, the steering angle of the front right wheel 106 is for a left turn, the steering angle of the rear right wheel 110 is for a right turn, and the steering angles of the front left wheel 104 and the rear left wheel 108 are for no turn.

In a view (m) of FIG. 5A, the steering angle of the front right wheel 106 is for a right turn, the steering angle of the rear left wheel 108 is for a left turn, and the steering angles of the front left wheel 104 and the rear right wheel 110 are for no turn. In a view (n) of FIG. 5A, the steering angle of the front right wheel 106 is for a right turn, the steering angle of the rear right wheel 110 is for a left turn, and the steering angles of the front left wheel 104 and the rear left wheel 108 are for no turn. In a view (o) of FIG. 5A, the steering angle of the front right wheel 106 is for a right turn, the steering angle of the rear left wheel 108 is for a right turn, and the steering angles of the front left wheel 104 and the rear right wheel 110 are for no turn. In a view (p) of FIG. 5A, the steering angle of the front right wheel 106 is for a right turn, the steering angle of the rear right wheel 110 is for a right turn, and the steering angles of the front left wheel 104 and the rear left wheel 108 are for no turn.

In a view (q) of FIG. 5A, the steering angle of the front left wheel 104 is for a left turn, the steering angle of the front right wheel 106 is for a left turn, the steering angle of the rear left wheel 108 is for a left turn, and the steering angle of rear right wheel 110 is for no turn. In a view (r) of FIG. 5A, the steering angle of the front left wheel 104 is for a left turn, the steering angle of the front right wheel 106 is for a left turn, the steering angle of the rear right wheel 110 is for a left turn, and the steering angle of the rear left wheel 108 is for no turn. In a view (s) of FIG. 5A, the steering angle of the front left wheel 104 is for a left turn, the steering angle of the front right wheel 106 is for a left turn, the steering angle of the rear left wheel 108 is for a right turn, and the steering angle of the rear right wheel 110 is for no turn. In a view (t) of FIG. 5A, the steering angle of the front left wheel 104 is for a left turn, the steering angle of the front right wheel 106 is for a left turn, the steering angle of the rear right wheel 110 is for a right turn, and the steering angle of the rear left wheel 108 is for no turn.

In a view (u) of FIG. 5A, the steering angle of the front left wheel 104 is for a right turn, the steering angle of the front right wheel 106 is for a left turn, the steering angle of the rear left wheel 108 is for a left turn, and the steering angle of the rear right wheel 110 is for no turn. In a view (v) of FIG. 5A, the steering angle of the front left wheel 104 is for a right turn, the steering angle of the front right wheel 106 is for a left turn, the steering angle of the rear right wheel 110 is for a left turn, and the steering angle of the rear left wheel 108 is for no turn. In a view (w) of FIG. 5A, the steering angle of the front left wheel 104 is for a right turn, the steering angle of the front right wheel 106 is for a left turn, the steering angle of the rear left wheel 108 is for a right turn, and the steering angle of the rear right wheel 110 is for no turn. In a view (x) of FIG. 5A, the steering angle of the front left wheel 104 is for a right turn, the steering angle of the front right wheel 106 is for a left turn, the steering angle of the rear right wheel 110 is for a right turn, and the steering angle of the rear left wheel 108 is for no turn.

In a view (y) of FIG. 5B, the steering angle of the front left wheel 104 is for a left turn, the steering angle of the front right wheel 106 is for a right turn, the steering angle of the rear left wheel 108 is for a left turn, and the steering angle of the rear right wheel 110 is for no turn. In a view (z) of FIG. 5B, the steering angle of the front left wheel 104 is for a left turn, the steering angle of the front right wheel 106 is for a right turn, the steering angle of the rear right wheel 110 is for a left turn, and the steering angle of the rear left wheel 108 is for no turn. In a view (aa) of FIG. 5B, the steering angle of the front left wheel 104 is for a left turn, the steering angle of the front right wheel 106 is for a right turn, the steering angle of the rear left wheel 108 is for a right turn, and the steering angle of the rear right wheel 110 is for no turn. In a view (bb) of FIG. 5B, the steering angle of the front left wheel 104 is for a left turn, the steering angle of the front right wheel 106 is for a right turn, the steering angle of the rear right wheel 110 is for a right turn, and the steering angle of the rear left wheel 108 is for no turn.

In a view (cc) of FIG. 5B, the steering angle of the front left wheel 104 is for a right turn, the steering angle of the front right wheel 106 is for a right turn, the steering angle of the rear left wheel 108 is for a left turn, and the steering angle of the rear right wheel 110 is for no turn. In a view (dd) of FIG. 5B, the steering angle of the front left wheel 104 is for a right turn, the steering angle of the front right wheel 106 is for a right turn, the steering angle of the rear right wheel 110 is for a left turn, and the steering angle of the rear left wheel 108 is for no turn. In a view (ee) of FIG. 5B, the steering angle of the front left wheel 104 is for a right turn, the steering angle of the front right wheel 106 is for a right turn, the steering angle of the rear left wheel 108 is for a right turn, and the steering angle of the rear right wheel 110 is for no turn. In a view (ff) of FIG. 5B, the steering angle of the front left wheel 104 is for a right turn, the steering angle of the front right wheel 106 is for a right turn, the steering angle of the rear right wheel 110 is for a right turn, and the steering angle of the rear left wheel 108 is for no turn.

In a view (gg) of FIG. 5B, the steering angle of the front left wheel 104 is for a left turn, the steering angle of the front right wheel 106 is for a right turn, the steering angle of the rear left wheel 108 is for a right turn, and the steering angle of the rear right wheel 110 is for a right turn. In a view (hh) of FIG. 5B, the steering angle of the front left wheel 104 is for a right turn, the steering angle of the front right wheel 106 is for a left turn, the steering angle of the rear left wheel 108 is for a right turn, and the steering angle of the rear right wheel 110 is for a right turn. In a view (ii) of FIG. 5B, the steering angle of the front left wheel 104 is for a right turn, the steering angle of the front right wheel 106 is for a right turn, the steering angle of the rear left wheel 108 is for a left turn, and the steering angle of the rear right wheel 110 is for a right turn. In a view (jj) of FIG. 5B, the steering angle of the front left wheel 104 is for a right turn, the steering angle of the front right wheel 106 is for a right turn, the steering angle of the rear left wheel 108 is for a right turn, and the steering angle of the rear right wheel 110 is for a left turn.

In a view (kk) of FIG. 5B, the steering angle of the front left wheel 104 is for a right turn, the steering angle of the front right wheel 106 is for a left turn, the steering angle of the rear left wheel 108 is for a left turn, and the steering angle of the rear right wheel 110 is for a left turn. In a view (ll) of FIG. 5B, the steering angle of the front left wheel 104 is for a left turn, the steering angle of the front right wheel 106 is for a right turn, the steering angle of the rear left wheel 108 is for a left turn, and the steering angle of the rear right wheel 110 is for a left turn. In a view (mm) of FIG. 5B, the steering angle of the front left wheel 104 is for a left turn, the steering angle of the front right wheel 106 is for a left turn, the steering angle of the rear left wheel 108 is for a right turn, and the steering angle of the rear right wheel 110 is for a left turn. In a view (nn) of FIG. 5B, the steering angle of the front left wheel 104 is for a left turn, the steering angle of the front right wheel 106 is for a left turn, the steering angle of the rear left wheel 108 is for a left turn, and the steering angle of the rear right wheel 110 is for a right turn.

In a view (oo) of FIG. 5B, the steering angle of the front left wheel 104 is for a left turn, the steering angle of the front right wheel 106 is for a right turn, the steering angle of the rear left wheel 108 is for a left turn, and the steering angle of the rear right wheel 110 is for a right turn. In a view (pp) of FIG. 5B, the steering angle of the front left wheel 104 is for a left turn, the steering angle of the front right wheel 106 is for a right turn, the steering angle of the rear left wheel 108 is for a right turn, and the steering angle of the rear right wheel 110 is for a left turn. In a view (qq) of FIG. 5B, the steering angle of the front left wheel 104 is for a right turn, the steering angle of the front right wheel 106 is for a left turn, the steering angle of the rear left wheel 108 is for a right turn, and the steering angle of the rear right wheel 110 is for a left turn. In a view (rr) of FIG. 5B, the steering angle of the front left wheel 104 is for a right turn, the steering angle of the front right wheel 106 is for a left turn, the steering angle of the rear left wheel 108 is for a left turn, and the steering angle of the rear right wheel 110 is for a right turn. In the view (rr), a distance between the front left wheel 104 and the front right wheel 106 is different from a distance between the front left wheel 104 and the rear left wheel 108. In the view (rr), a distance between the rear right wheel 110 and the rear left wheel 108 is different from a distance between the rear right wheel 110 and the front right wheel 106.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, 5A, and 5B but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle, comprising:
a first wheel;
a second wheel; and
a steering system configured to concurrently cause, at a time at which the vehicle is in a park mode:
 a steering angle of the first wheel to be at a first angle; and
 a steering angle of the second wheel to be at a second angle,
wherein:
 the steering system comprises:
  a first actuator configured to cause the first wheel to be at the first angle, and
  a second actuator configured to cause the second wheel to be at the second angle,
 a first difference angle, being a difference of the first angle subtracted from the second angle, is greater than an angle determined to comply with Ackermann steering geometry, and
 either both the first wheel and the second wheel are front wheels or both the first wheel and the second wheel are rear wheels.

2. The vehicle of claim 1, wherein:
the steering system is configured to determine the steering angle of the first wheel and the steering angle of the second wheel,
the first actuator is further configured to cause the first wheel to be in a position in accordance with a determination of the steering angle of the first wheel; and
the second actuator is further configured to cause the second wheel to be in a position in accordance with a determination of the steering angle of the second wheel, and
the steering system is configured to independently operate the first actuator and the second actuator.

3. The vehicle of claim 1, wherein the steering system is configured to concurrently prevent, at a time at which the vehicle is in a mode different from the park mode:
the steering angle of the first wheel from being at the first angle; and
the steering angle of the second wheel from being at the second angle.

4. The vehicle of claim 1:
further comprising a communications device configured to:
 receive information; and
 cause, in response to a receipt of the information, a signal to be conveyed to the steering system,
wherein the steering system is configured to concurrently cause, in response to a receipt of the signal:
 the steering angle of the first wheel to be at the first angle; and
 the steering angle of the second wheel to be at the second angle.

5. The vehicle of claim 1:
further comprising a communications device configured to:

receive information indicative of a value of the first angle and a value of the second angle; and cause, in response to a receipt of the information, a signal to be conveyed to the steering system, wherein the steering system is configured to cause, in response to a receipt of the signal:

the value of the first angle to be stored in a memory of the steering system, and the value of the second angle to be stored in the memory of the steering system.

6. The vehicle of claim 1, wherein the steering system comprises:

a module configured to determine a value of the first angle and a value of the second angle; and a memory configured to store the value of the first angle and the value of the second angle.

7. The vehicle of claim 6:

further comprising a device configured to:

determine an orientation of the vehicle with respect to a three-dimensional shape of a topological relief of a location of the vehicle; and cause, in response to a determination of the orientation of the vehicle, a signal to be conveyed to the steering system, wherein the module is configured to determine, in response to a receipt of the signal, the value of the first angle and the value of the second angle.

8. The vehicle of claim 6:

further comprising a device configured to:

determine a presence of a curb of a road within one meter of a location of at least one of the first wheel or the second wheel; and cause, in response to a determination of the presence of the curb, a signal to be conveyed to the steering system, wherein the module is configured to determine, in response to a receipt of the signal, the value of the first angle and the value of the second angle.

9. The vehicle of claim 1:

further comprising:

a third wheel; and a fourth wheel, wherein:

the steering system is further configured to concurrently cause:

a steering angle of the third wheel to be at a third angle; and a steering angle of the fourth wheel to be at a fourth angle, and a second difference angle, being a difference of the third angle subtracted from the fourth angle, is greater than the angle determined to comply with Ackermann steering geometry.

10. The vehicle of claim 1, wherein the angle determined to comply with Ackermann steering geometry is ten degrees.

\* \* \* \* \*